(12) United States Patent
Roy et al.

(10) Patent No.: US 12,704,962 B2
(45) Date of Patent: Aug. 11, 2026

(54) SENSING WITHIN AN EMBEDDED DYNAMIC RANDOM ACCESS MEMORIES (DRAMs) HAVING REFERENCE CELLS

(71) Applicant: NXP USA, Inc., Austin, TX (US)

(72) Inventors: Anirban Roy, Austin, TX (US); Nihaar N. Mahatme, Austin, TX (US)

(73) Assignee: NXP USA, Inc., Austin, TX (US)

( * ) Notice: Subject to any disclaimer, the term of this patent is extended or adjusted under 35 U.S.C. 154(b) by 242 days.

(21) Appl. No.: 18/444,816

(22) Filed: Feb. 19, 2024

(65) Prior Publication Data

US 2025/0264992 A1 Aug. 21, 2025

(51) Int. Cl.
*G06F 3/06* (2006.01)

(52) U.S. Cl.
CPC .......... *G06F 3/0611* (2013.01); *G06F 3/0659* (2013.01); *G06F 3/0673* (2013.01)

(58) Field of Classification Search
CPC ...................................................... G11C 7/065
See application file for complete search history.

(56) References Cited

U.S. PATENT DOCUMENTS 6,687,162 B1 2/2004 Hsueh et al.
8,587,994 B2 11/2013 Kim et al.
9,922,696 B1 * 3/2018 Li ...................... G11C 11/4091
11,133,041 B1 * 9/2021 Pan ..................... G11C 29/021
2003/0090949 A1 5/2003 Tedrow et al.
2006/0028889 A1 * 2/2006 Liaw ...................... G11C 11/16 365/209
2007/0147160 A1 * 6/2007 Hanzawa ............ G11C 29/028 365/230.03
2009/0010079 A1 1/2009 Kang et al.
2009/0154261 A1 * 6/2009 Achter .................. G11C 7/106 365/189.15
2015/0170730 A1 * 6/2015 Antonyan ........... G11C 11/4091 365/189.07
2022/0075554 A1 * 3/2022 Miller ................ G11C 11/5642

OTHER PUBLICATIONS

Xinpeng Jiang et al.: "A novel dual-reference sensing scheme for computing in memory within STT-MRAM", Microelectronics Journal, Mackintosh Publications Ltd. Luton, GB, vol. 121, Jan. 25, 2022 (Jan. 25, 2022), pp. 1-6.

(Continued)

*Primary Examiner* — Douglas King
(74) *Attorney, Agent, or Firm* — Joanna G. Geld

(57) ABSTRACT

A dynamic random access memory (DRAM) array has a first portion configured as a data array and a second portion configured as a reference array. The DRAM array includes read bit lines which include a first plurality of read bit lines in the data array and a second plurality of read bit lines in the reference array. Read circuitry includes a plurality of sensing circuits, each sensing circuit coupled to a corresponding read bit line of the first plurality of read bit lines and configured to receive a first reference voltage generated by a first read bit line of the second plurality of read bit lines and a second reference voltage generated by a second read bit line of the second plurality of bit lines. The plurality of sensing circuits is configured to provide a corresponding bit of an output read value.

18 Claims, 5 Drawing Sheets

(56) References Cited

OTHER PUBLICATIONS

Harel et al.: "64-kB 65-nm GC-eDRAM With Half-Select Support and Parallel Refresh Technique", IEEE Solid-State Circuits Letters (vol. 5), Jun. 13, 2022, DOI: 10.1109/LSSC.2022.3182531, pp. 170-173.

Hoang et al.: "A 65ns 1Mb CMOS alternate metal virtual ground EPROM with dual reference sensing scheme and word line voltage regulator", 1993 International Symposium on VLSI Technology, Systems, and Applications Proceedings of Technical Papers, May 12-14, 1993, Taipei, Taiwan, DOI: 10.1109/VTSA. 1993.263675, pp. 1-3.

Kang et al.: "Dynamic Dual-Reference Sensing Scheme for Deep Submicrometer STT-MRAM", €IEEE Transactions on Circuits and Systems I: Regular Papers (vol. 64, Issue: 1, Jan. 2017), DOI: 10.1109/TCSI.2016.2606438, Oct. 19, 2016, pp. 122-132.

Na et al.: "A Double-Sensing-Margin Offset-Canceling Dual-Stage Sensing Circuit for Resistive Nonvolatile Memory", IEEE Transactions on Circuits and Systems II: Express Briefs (vol. 62, Issue: 12, Dec. 2015), DOI: 10.1109/TCSII.2015.2468993, Aug. 17, 2015, pp. 1109-1113.

Na et al.: "An Offset-Canceling Triple-Stage Sensing Circuit for Deep Submicrometer STT-RAM", IEEE Transactions on Very Large Scale Integration (VLSI) Systems ( vol. 22, Issue: 7, Jul. 2014), DOI: 10.1109/TVLSI.2013.2294095, Jan. 2, 2014, pp. 1620-1624.

* cited by examiner

10
DATA ARRAY
14
REFERENCE ARRAY
16
PRECHARGE CIRCUIT
22
RBL1
RBLk
RBLRef0
RBLRef1
WBL1
WBLk
WBLRef0
WBLRef1
18
ROW DECODER
RWL1
WWL1
REF WWL1
RWLM
WWLM
REF WWLM
BIT CELL
28
BIT CELL
29
REF CELL (0)
32
REF CELL (1)
33
BIT CELL
30
BIT CELL
31
REF CELL (0)
34
REF CELL (1)
35
REF WWL1
REF WWLM
12
ADDR, DATA, R/W
20
CONTROL CIRCUIT
VDD
24
READ/WRITE CIRCUITRY
D1
Dk
26
I/O BUFFER

REF WWL1
RWL1
RBLRef0₂
RBLRef0₁
RBLRef0
WBLRef0 (= VSS)
WBLRef0₂
WBLRef0₁
SN
SC
86
82
84
88
80
50
48
49
52
32

SENSING WITHIN AN EMBEDDED DYNAMIC RANDOM ACCESS MEMORIES (DRAMs) HAVING REFERENCE CELLS

BACKGROUND

Field

This disclosure relates generally to memories, and more specifically, to sensing within embedded DRAMs having reference cells.

Related Art

Due to their smaller sizes and improved scaling ability, embedded dynamic random access memories (DRAMs) are emerging as a strong alternative to static random access memories (SRAMs). DRAMs use capacitors as the storage elements, in which a charged capacitor represents a first logic state (e.g. a logic level high) while a discharged capacitor represents a second logic state (e.g. a logic level low). The use of capacitors, though, makes the bit cells of the these DRAMs susceptible to data loss due to leakage. This leakage also results in degrading read margins to distinguish between a stored logic one versus a stored logic zero. Refresh operations can be used to prevent against data loss, however, refresh operations add latency, resulting in a tradeoff between sensing margin and refresh frequency. Therefore, a need exists for improved sensing capable of working with smaller sense margins, even across process, voltage, and temperature (PVT) variations.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As discussed above, DRAMs are susceptible to leakage which results in degradation of read margins. Therefore, in order to improve reading robustness, a dual reference scheme is used for an embedded DRAM which improves the sense margin. In one embodiment, the dual reference scheme for sensing is implemented with a dual stage sense amplifier to determine the stored logic state (one or zero) of an accessed bit cell. The dual reference generation results in improved sensing across PVT as compared to single ended sensing which uses a single read reference to distinguish between logic states. The embedded DRAM includes a memory array having both a data array portion and a reference array portion. In one aspect, the dual references used for a read from the data array portion are generated based on reference cells of the reference array portion which are continuously written to logic ones and zeros. The reference write word lines of the reference array portion are isolated from the write word lines of the data array portion of the DRAM so that they may be held at a selected voltage, as needed, to continuously write the ones or zeros. With the use of the dual references, it may be feasible to reduce the refresh frequency and thus reduce latency, thereby improving performance.

Figure 1:
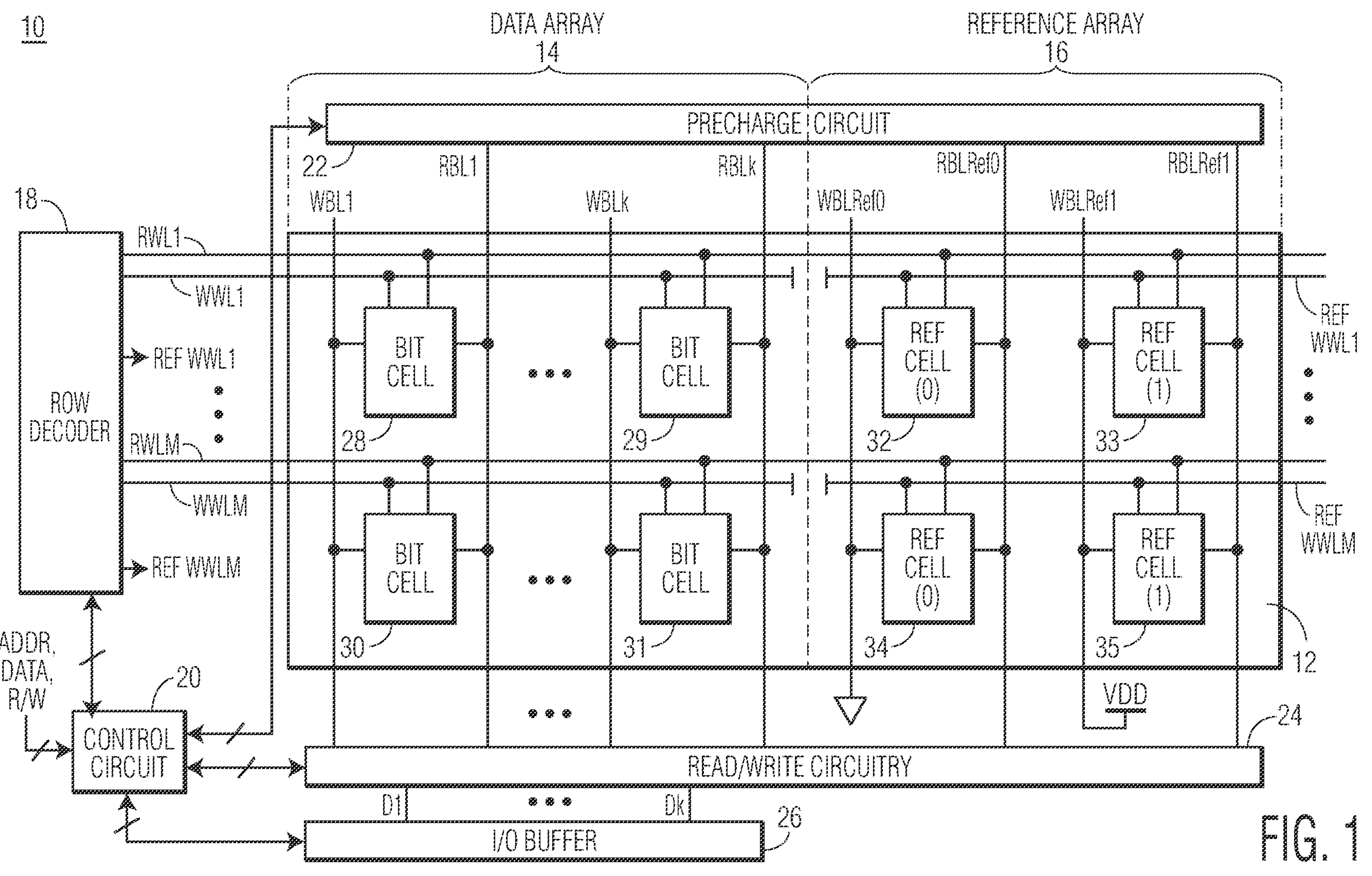
FIG. 1 illustrates, in partial schematic and partial block diagram form, an embedded DRAM capable of use within a data processing system, in accordance with an embodiment of the present invention.

FIG. 1 illustrates, in block diagram form, a memory system 10 (also referred to simply as memory 10), in accordance with one embodiment of the present invention. Memory 10 may be a DRAM which may be embedded within a data processing system, in which the data processing system can be implemented as a system on a chip (SoC). Memory 10 may therefore be referred to as embedded DRAM (eDRAM) 10 or simply DRAM 10. The data processing system can be any type of data processing system having, for example, a processor (which can be any kind of processor such as, for example, a central processing unit (CPU), graphics processing unit (GPU), etc.) in which the processor can access DRAM 10 to perform reads from or writes to the DRAM. The data processing system, in addition to the processor, may include any number and types of elements, such as additional processors or other masters, additional memories, peripherals, I/O devices, etc., in which the elements of the data processing system can be coupled to each other via a system interconnect, such as, for example, a system bus, crossbar switch, fabric, etc. Note that any master of the data processing system may access DRAM 10.

As illustrated in FIG. 1, DRAM 10 includes an array 12 of DRAM bit cells (including, e.g., bit cells 28-35), in which each bit cell is located at an intersection of a corresponding word line and corresponding bit line. Array 12 includes M word lines (WL1-WLM) and k+2 bit lines (BL1-BLK, BLRef0, and BLRef1) in which each word line is implemented using both a read word line (RWL1-RWLM) and a write word line (WWL1-WWLM or REF WWL1-REF WWLM), and each bit line is implemented using both a read bit line (RBL1-RBLk, RBLRef0, and RBLRef1) and a write bit line (WBL1-WBLk, WBLRef0, and WBLRef1). Also, each of M and k can be any integer greater than one. Array 12 is divided into a data array portion (data array 14) and a reference array portion (reference array 16), in which BL1-BLk correspond to the bit lines used by data array 14 and BLRef0 and BLRef1 correspond to the bit lines used by reference array 16. The M write word lines of array 12 are separate between the data array and reference array. Therefore, WWL1-WWLM refer to the word lines used by data array 14, but in reference array 16, the word lines are separate from those in data array 14 and are referred to as reference word lines (REF WWL1-REF WWLM), in which each REF WWL of reference array 16 corresponds to a WWL of data array 14 in a same row of array 12 (but is not connected to any WWL of data array 14).

Data array 14 includes a plurality of DRAM bit cells (e.g. bit cells 28-31) in which each bit cell is located at the intersection of a corresponding word line (RWL/WWL) and a corresponding bit line (RBL/WBL) of data array 14. Each bit cell of data array 14 is therefore coupled to a corresponding RWL of RWL1-RWLM, WWL of WWL1-WWLM, RBL of RBL1-RBLk, and WBL of WBL1-WBLk. Reference array 16 includes a plurality of DRAM bits cells (e.g. bit cells 32-35, which are also referred to as references cells 32-35) in which each reference cell is located at the intersection of a corresponding word line (RWL/REF WWL) and a corresponding bit line (RBLRef/WBLRef) of reference array 16. Each reference cell of reference array 16 is therefore coupled to a corresponding RWL of RWL1-RWLM, REF WWL of REF WWL1-REF WWLM, RBLRef of RBLRef0-RBLRef1, and WBLRef of WBLRef0-WBLRef1. Each bit cell of array 12, including those of data array 14 and reference array 16, includes a capacitor (i.e. capacitive storage element), a write select transistor (i.e. write access transistor), and a read select transistor (i.e. read access transistor) and is coupled to a corresponding word line and corresponding bit line, the details of which will be described in reference to FIG. 2 below.

DRAM 10 also includes a row decoder 18 coupled to the rows of array 12 via word lines (RWL1-RWLM and WWL1-WWLM), read/write circuitry 24 coupled to columns of array 12 via bit lines (RBL1-RBLK, RBLRef0, RBLRef1 and WBL1-WBLK, WBLRef0, WBLRef1), an input/output (I/O buffer) 26, a precharge circuit 22 coupled to the bit lines of array 12, and a control circuit 20 coupled to row decoder 18, read/write circuitry 24, and I/O buffer 26. An access request to DRAM 10 can be a read access request or a write access request and includes an access address (ADDR), write data (DATA) if the access request is a write request, and control information such as a R/W indicator to indicate whether the access request corresponds to a read or write access. Control circuit 20 receives ADDR, DATA, and R/W, and provides control signals accordingly to row decoder 18, read/write circuitry 24, and I/O buffer 26, as needed, to perform the requested access request. In one example, control circuit 20 provides ADDR to row decoder 18 which activates a selected word line of RWL1-RWLM (for a read) or of WWL1-WWLM (for a write) based on ADDR. In the case of a write access, capacitors of selected bit cells along the selected row (coupled to the selected word line) are charged or discharged by read/write circuitry 24, in accordance with the corresponding write data (received as D1-Dk by read/write circuitry 24 from control circuit 20 via I/O buffer 26), to properly store a logic one or logic zero, respectively, in each selected DRAM cell. The charging/discharging of the capacitor in each selected DRAM bit cells is done via a corresponding bit line and select transistor. For a read, charges on the capacitors along the selected row are sensed by corresponding sense amplifiers in read/write circuity 24 to determine the stored states of the select row (provided as D1-Dk by read/write circuitry 24), in which these stored states are latched into I/O buffer 26 such that they can be returned as read data. In one embodiment, prior to a read access, the bit lines of array 12 are precharged by precharge circuit 22.

Note that, although not illustrated in FIG. 1, DRAM 10 is coupled to a first voltage supply node configured to supply a first supply voltage, VDD, and a second voltage supply node configured to supply a second supply voltage, VSS, in which VDD is greater than VSS. In one embodiment, VSS is ground. Also, note that each of the first and second voltage supply nodes may simply be referred to herein by the corresponding supply voltages VDD and VSS, respectively. As will be described in reference to FIG. 2, each of the bit cells of DRAM 10 is implemented as a 3T DRAM cell, including 3 transistors. However, alternate embodiments may use other types of DRAM bit cells, such as a 1-transistor 1-capacitor (1T1C) DRAM bit cell, 2-transistor (2T) DRAM bit cell or a 4-transistor (4T) DRAM bit cell. Regardless of the type of DRAM bit cell in DRAM 10, each DRAM bit cell is structured the same, in which a charged capacitor represents a first logic state (e.g. a logic level high) while a discharged capacitor represents a second logic state (e.g. a logic level low). Alternatively, a charged capacitor may represent the logic level low state and a discharged capacitor the logic level high state.

Figure 2:
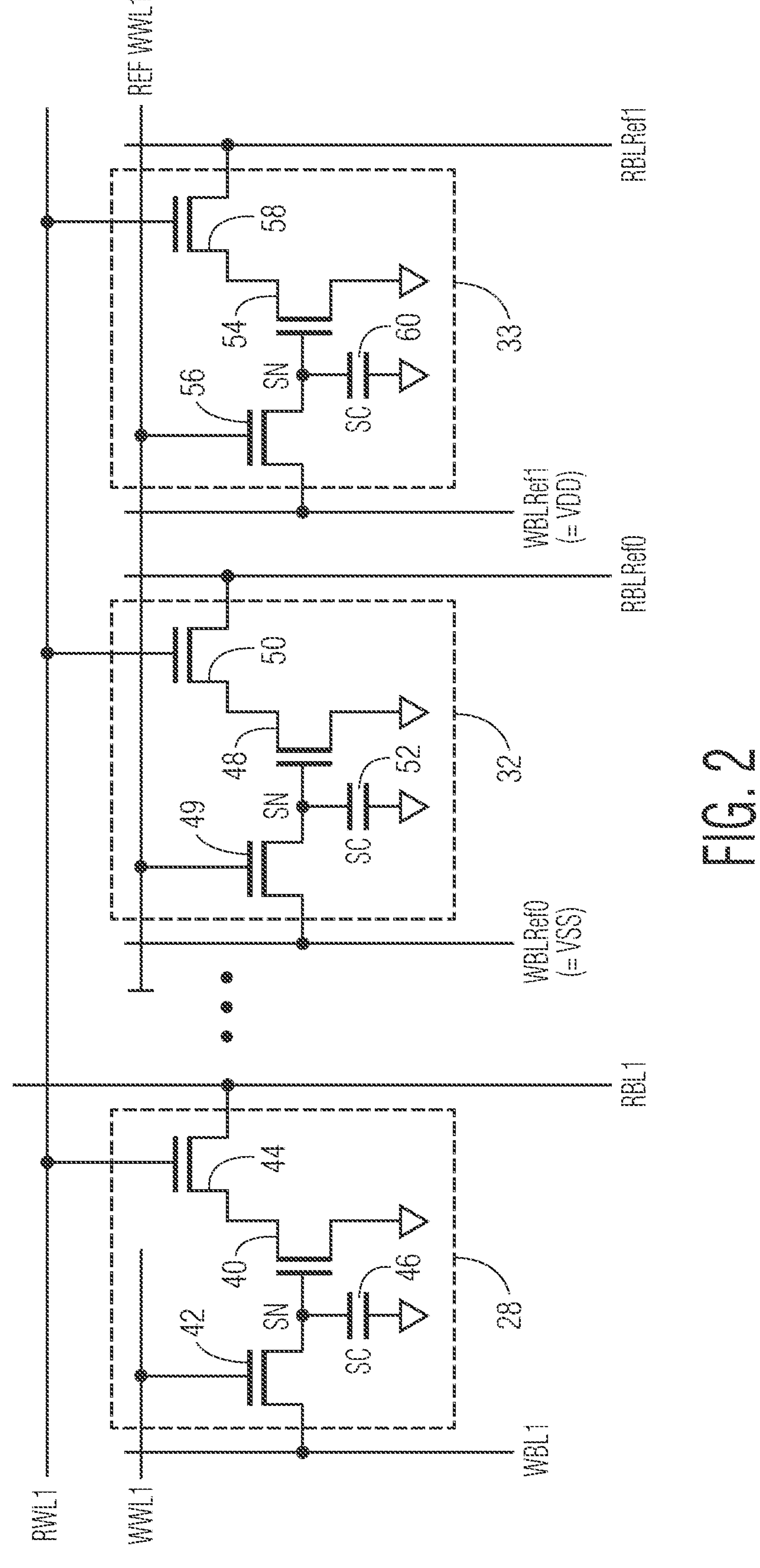
FIG. 2 illustrates, in schematic form, a data bit cell and reference bit cells of the DRAM of FIG. 1, in accordance with an embodiment of the present invention.

FIG. 2 illustrates, in schematic form, a bit cell and reference cells located in a first row of DRAM 10, in accordance with an embodiment of the present invention. The illustrated first row of FIG. 2 corresponds to the first (i.e. top) row of DRAM 10 of FIG. 1, and includes bit cell 28, reference cell 32, and reference cell 33, RWL1, WWL1, REF WWL1, RBL1, WBL1, WBLRef0, RBLRef0, WBLRef1, and WBLRef0. Bit cell 28 includes a storage capacitor SC 46 coupled to a storage node labeled SN, a storage transistor 40, a write access transistor 42, and a read access transistor 44. Transistor 40 has a control electrode coupled to SN, a first current electrode, and a second current electrode coupled to VSS. Note that although CS 46 is illustrated as an explicit capacitor, it may represent a parasitic capacitance of cell 28, such as a gate capacitance of transistor 40 and diffusion capacitance of transistor 42. Transistor 42 has a control electrode coupled to a corresponding word line of the first row (WWL1), a first current electrode coupled to a corresponding bit line (WBL1), and a second current electrode coupled to SN. Transistor 44 has a control electrode coupled to a corresponding word line of the first row (RWL1), a first current electrode coupled to the first current electrode of transistor 40, and a second current electrode coupled to a corresponding bit line (RBL1). In the illustrated embodiment, each transistor in bit cell 28 is an n-channel metal-oxide semiconductor (NMOS) transistor. However, in alternate embodiments, a cell may be constructed using p-channel metal-oxide semiconductor (PMOS) transistors or a combination of NMOS and PMOS transistors.

In operation, bit cell 28 stores a first logic state (e.g. logic level one) when SC 46 is charged and a second logic state (e.g. logic level zero) when SC 46 is discharged. For a write to bit cell 28, row decoder 18 activates the corresponding write word line (WWL1) by applying a write voltage (e.g. VDD) onto WWL1. This results in turning on transistor 42. If writing a logic level one, read/write circuitry 24 provides VDD onto the corresponding write bit line (WBL1) such that SC 36 is charged via WBL1 and transistor 42. If writing a logic level zero, read/write circuitry 24 couples WBL1 to VSS which discharges SC 46 via transistor 42 and WBL1. (Note that during a write, the corresponding read word line, RWL1, is set to VSS so as to turn off transistor 44.) After a write, prior to performing any read from data array 14, the read bit lines (RBL1-RBLk) are precharged to a precharge voltage (e.g. VDD) by precharge circuit 22. In one embodiment, the read bit lines are precharged to VDD via an NMOS transistor (in which case the precharge voltage is about VDD or "VDD-Vt"). Alternatively, other precharge levels may be used. For a read from a selected cell of data array 14, the value on the corresponding WBL can be interpreted as the value of BL, while the value on the corresponding RBL can be interpreted as the value of BLbar (i.e. the inverse of BL).

Therefore, for a read from bit cell 28 (in which RBL1 is precharged to VDD), row decoder activates the corresponding read word line (RWL1) by applying a read voltage (e.g. VDD) onto RWL1, which turns on transistor 44 (while setting WWL1 to zero so as to turn off transistor 42). If, during a read from bit cell 28, a logic level zero is currently stored such that SC is in a discharged state, transistor 40 is held off and RBL1 is maintained at its precharged level (about VDD or VDD-Vt). RBL1 remaining at about VDD is interpreted by read/write circuitry 24 as corresponding to a logic level 0 (e.g., if RBL1=BL1bar=1, then BL1=0). If, however, a logic level one is currently stored such that SC 46 is fully charged, transistor 40 is on in which provides a discharge path from RBL1 to VSS, thus pulling RBL1 to VSS. This is interpreted by read/write circuitry 24 as corresponding to a logic level 1 (e.g., if RBL1=BL1bar=0, then BL1=1). Note that the description of operation for bit cell 28 applies analogously to the other bit cells of DRAM 10.

Still referring to FIG. 2, reference cell 32 corresponds to a reference cell which is continuously written with a first logic state (e.g. zero) while reference cell 33 corresponds to a reference cell which is continuously written with a second logic state (e.g. one), opposite the first logic state. Therefore, reference cell 32 may be referred to as reference cell (0) and reference cell 33 as reference cell (1), in which a reference cell labeled with "(0)" is continuously written with a logic level zero, and a reference cell labeled with a "(1)" is continuously written with a logic level one, to reinforce the logic states stored in the reference cells.

Reference cells 32 and 33 include elements analogous to bit cell 28, in which the connectivity and functionality of the elements in the reference cells are analogous to those of bit cell 28. Reference cell 32 includes a storage capacitor SC 52 coupled to a storage node labeled SN, a storage transistor 48, a write access transistor 49, and a read access transistor 50. Transistor 48 has a control electrode coupled to SN, a first current electrode, and a second current electrode coupled to VSS. Note that, as with any bit cell, although SC 52 is illustrated as an explicit capacitor, it may represent a parasitic capacitance of cell 32. Transistor 49 has a control electrode coupled to a corresponding word line of the first row (REF WWL1), a first current electrode coupled to a corresponding bit line (WBLRef0), and a second current electrode coupled to SN. Transistor 50 has a control electrode coupled to a corresponding word line of the first row (RWL1), a first current electrode coupled to the first current electrode of transistor 48, and a second current electrode coupled to a corresponding bit line (RBLRef0). Similarly, reference cell 33 includes a storage capacitor SC 60 coupled to a storage node labeled SN, a storage transistor 54, a write access transistor 56, and a read access transistor 58. Transistor 54 has a control electrode coupled to SN, a first current electrode, and a second current electrode coupled to VSS. Note that, as with any bit cell, although SC 60 is illustrated as an explicit capacitor, it may represent a parasitic capacitance of cell 33. Transistor 56 has a control electrode coupled to a corresponding word line of the first row (REF WWL1), a first current electrode coupled to a corresponding bit line (WBLRef1), and a second current electrode coupled to SN. Transistor 58 has a control electrode coupled to a corresponding word line of the first row (RWL1), a first current electrode coupled to the first current electrode of transistor 54, and a second current electrode coupled to a corresponding bit line (RBLRef1). In the illustrated embodiment, each transistor in reference cell 32 and reference cell 33 is also an NMOS transistor.

The corresponding write bit line for cell 32 (WBLRef0) is coupled to VSS, while the corresponding write bit line for cell 33 is coupled to VDD. As will be described below, RBLRef0 of reference cell 32 and RBLRef1 of reference cell 33 will be used by sense amplifiers within read/write circuitry 24 to sense the stored logic states in bit cells selected for a read access. Also, since REF WWL1-REF WWLM are segmented from the write word lines of data array 14 (WWL1-WWLM), they can each be held at VDD to continuously write a 0 or 1 into reference cells 32 and 33, respectively. That is, REF WWL0-REF WWL1M are continuously activated to perform writes to the reference cells of reference array 16, even during read and write operations on selected bit cells in data array 14. Referring to the example of FIG. 2, with REF WWL1 held at VDD and WBLRef0 held at VSS, the internal SN node of reference cell 32 is driven to VSS (corresponding to the fully discharged state) via transistor 49, and with REF WWL1 and WBLRef1 both held at VDD, the internal SN node of reference cell 33 is driven to VDD (corresponding in the fully charged state) via transistor 56. In this manner, the state of the storage node is not dependent upon the charge stored on the storage capacitor. Note that similar to RBL1-RBLK, RBLRef0 and RBLRef1 are also precharged to about VDD prior to a read operation. (As with RBL1-RBLk, RBLref0 and RBLRef1 can be precharged by precharge circuit 22 via an NMOS transistor to VDD-Vt.) Therefore, when a read of the row containing bit cell 28 is performed, RWL1 is activated, which also activates read access transistors 50 and 58. For reference cell 32, storage transistor 48 is off, thus RBLRef0 is maintained at its precharge level (e.g. about VDD) while for reference cell 33, storage transistor 54 is on, discharging RBLRef1 to VSS.

For the illustrated embodiment, each row of reference array 16 includes two reference cells such as reference cells 32 and 33, in which REF WWL1-REF WWLM (which are segmented from WWL1-WWLM) are held at VDD so that a 0 is continuously written to one of the reference cells of each row (e.g. the reference cells coupled to WBLRef0, thus driving their corresponding internal SN node to VSS) and a 1 is continuously written to the other of the reference cells of each row (e.g. reference cells coupled to WBLRef1, thus driving their corresponding internal SN node to VDD). In this manner, the reference cells are continuously reinforced to store a strong zero or a strong one, which can be used when sensing the values of RBL1-RBLk during read operations.

During a read operation from selected bit cells of data array 14 (i.e. from bit cells addressed by the received access address), sense amplifiers within read/write circuitry 24 can determine the difference between a stored one and stored zero by performing a single comparison to compare the voltage on the corresponding RBL to an ideal reference. For example, the ideal reference may be a voltage which always fall between a sensed voltage on the RBL when a stored "one" is read and a sensed voltage on the RBL when a stored "zero" is read. However, over time, with each subsequent refresh of array 12, the sensed voltage of the RBL changes such that, for example, the sensed voltage on the RBL when a stored "one" is read increases over time, while the sensed voltage on the RBL when a stored "zero" is read decreases over time, decreasing the voltage margins for distinguishing between stored "ones" and "zeros," resulting in possible read errors. These changes over time occur due to increased leakage currents of the bit cells which prevents a bit cell from remaining at a fully discharged state (for a stored 0) or fully charged state (for a stored 1). Further, as the voltage margins decrease, the required refresh rate of the DRAM bit cells increases (since refreshes are needed sooner to prevent data loss), which results in increased latency and power consumption.

Figure 3:
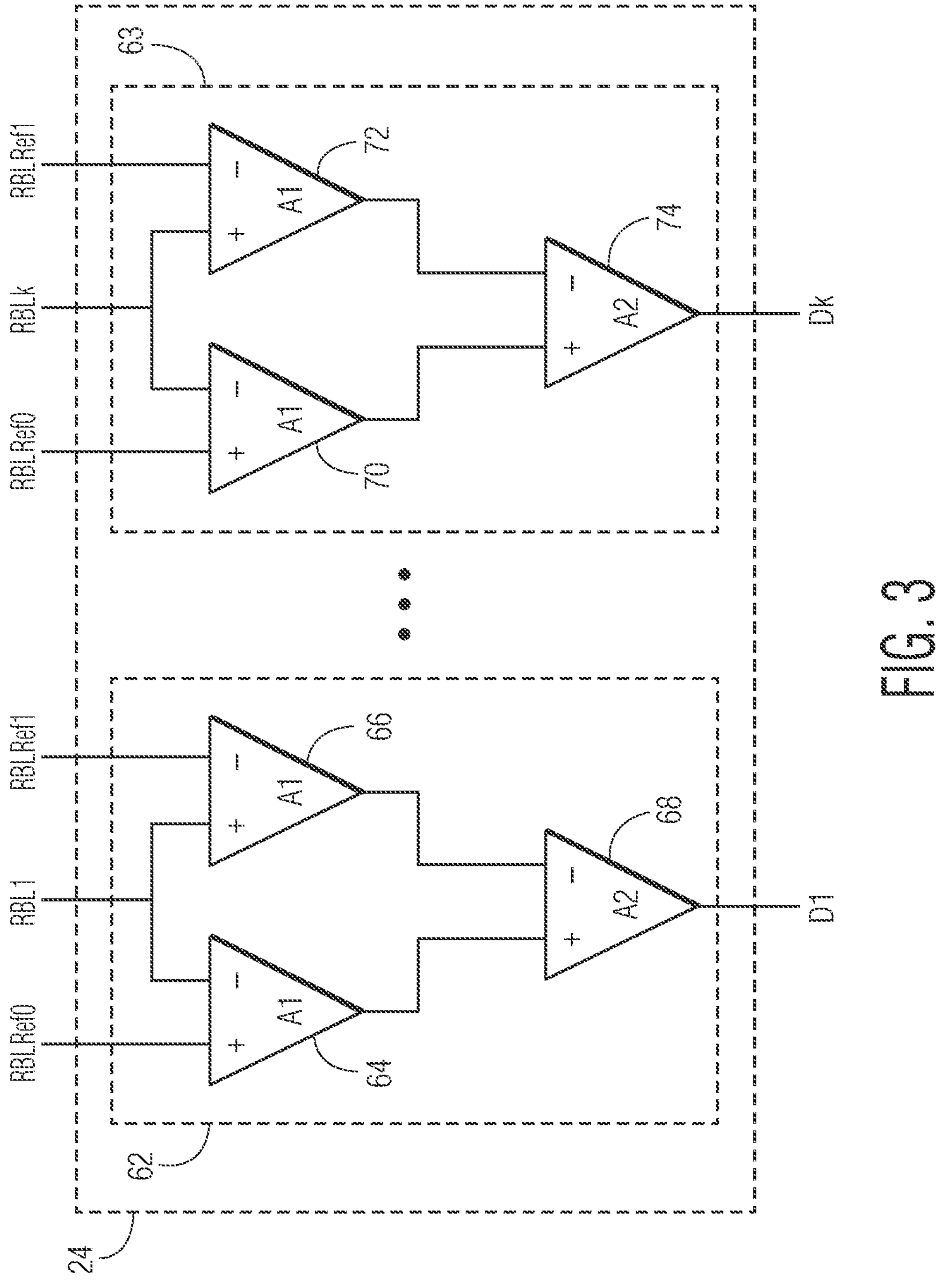
FIG. 3 illustrates, in block diagram form, a portion of read circuitry of the DRAM of FIG. 1, in accordance with an embodiment of the present invention.

Therefore, in one embodiment, in order to improve the sensing of stored values in selected bit cells of data array 14, the sense amplifiers in read/write circuitry 24 receive both RBLRef0 and RBLRef1 from reference array 16 as references used in sensing RBL1-RBLk for a read operation (in which the corresponding reference cells coupled to RBLRef0 and RBLRef1 have been continuously reenforced to a logic level 0 and logic level 1, respectively). FIG. 3 illustrates, in block diagram form, a portion of the read circuitry of read/write circuitry 24 in accordance with an embodiment of the present invention. The read circuitry of read/write circuitry 24 includes a sensing circuit for each RBL (e.g. sensing circuits 62-63 coupled to sense RBL1-RBLk, respectively). The RBLs of reference array 16 (RBLRef0 and RBLRef1) are also provided to each sensing circuit. Therefore, each sensing circuit 62-63 is coupled to receive one RBL from data array 14 and both RBLRef0 and RBLRef1 from reference array 16, and, based on a pair of comparisons performed between the one RBL and RBLRef0 as well as the one RBL and RBLRef1, provides one corresponding bit of the k-bit output read value D1-Dk (also referred to as read data).

Sensing circuit 62 corresponds to RBL1 and includes three sense amplifiers 64, 66, and 68, arranged into two stages, in which a first stage (i.e. input stage) includes amplifiers 64 and 66 and a second stage (i.e. output stage) includes amplifier 68. Amplifier 64 includes a first input (e.g. an inverting input) coupled to RBL1, a second input (e.g. a non-inverting input) coupled to RBLRef0, and an output coupled to a first input (e.g. a non-inverting input) of amplifier 68. Amplifier 66 includes a first input (e.g. a non-inverting input) coupled to RBL1, a second input (e.g. an inverting input) coupled to RBLRef1, and an output coupled to a second input (e.g. an inverting input) of amplifier 68. An output of amplifier 68 is coupled to provide D1 to IO buffer 26. Each amplifier has a corresponding gain, in which the gain of each of amplifiers 64 and 66 is A1 while a gain of amplifier 68 is A2, in which A2>A1. Therefore, in the illustrated embodiment, each amplifier of the first stage has a same gain, and the amplifier of the second stage has a greater gain than each amplifier of the first stage. Sensing circuit 63 corresponds to RBLk and includes three sense amplifiers 70, 72, and 74, in which the amplifiers of sensing circuit 63 are coupled analogously to those of sense amplifiers 64, 66, and 68, respectively, of sensing circuit 62. However, the second input (inverting input) of amplifier 70 and the first input (non-inverting input) of amplifier 72 are coupled to RBLk, and an output of amplifier 74 is coupled to provide Dk to IO buffer 26. Therefore, each sensing circuit of read/write circuitry 24 includes analogous circuitry to sensing circuit 62 to receive RBL1-RBLK, RBLRef0, and RBLRef1 from array 12 and to provide D1-Dk to IO buffer 26.

Operation of each sensing circuit will be described in reference to sensing circuit 62 of FIG. 3, in which it is assumed that the selected bit corresponding to RBL1 (e.g. bit cell 28) is being read. Note that "RBLCell" refers to the RBL being sensed, or RBL1 in the current example. Also, the voltage on RBLCell should fall between RBLRef0 (at about VDD corresponding to a strong 0 stored in the corresponding reference cell) and RBLRef1 (at VSS corresponding to a strong 1 stored in the corresponding reference cell). Therefore, for RBL1 as an example, amplifier 64 senses the difference between the voltage of RBL1 and the voltage of RBLRef0, and amplifier 66 senses the difference between the voltage of RBL1 and RBLRef1, and amplifier 68 amplifies the difference between these sensed differences. For example, if the selected bit corresponding to RBL1 (e.g. bit cell 28) being read stores a logic level one, in which capacitor 46 is charged, the voltage on RBL1 should ideally be VSS. Although it may not be at VSS due to leakage, it should at least be closer to RBLRef1 than to RBLERef0. Therefore, since the difference between the voltage on RBL1 and RBLRef0 is greater than the difference between the voltage on RBL1 and RBLRef1, the output of sense amplifier 68 (and thus D1 of the read value) is provided (and latched) at a logic level 1. On the other hand, if the selected bit corresponding to RBL1 instead stores a logic level 0, in which capacitor 46 is discharged, the voltage on RBL1 should ideally be the precharge voltage (e.g. VDD-Vt), or at least closer to RBLRef0 than to RBLERef1. Therefore, since the difference between the voltage on RBL1 and RBLRef0 is less than the difference between the voltage on RBL1 and RBLRef1, the output of sense amplifier 68 (and thus D1 of the read value) is provided (and latched) at a logic level 0. Each sensing circuit operates analogously to sensing circuit 62 in which each sensing circuit performs a pair of comparisons using RBLCell (by comparing RBLCell to each of RBLRef0 and RBLRef1) to determine a corresponding bit of the read value.

Figure 4:
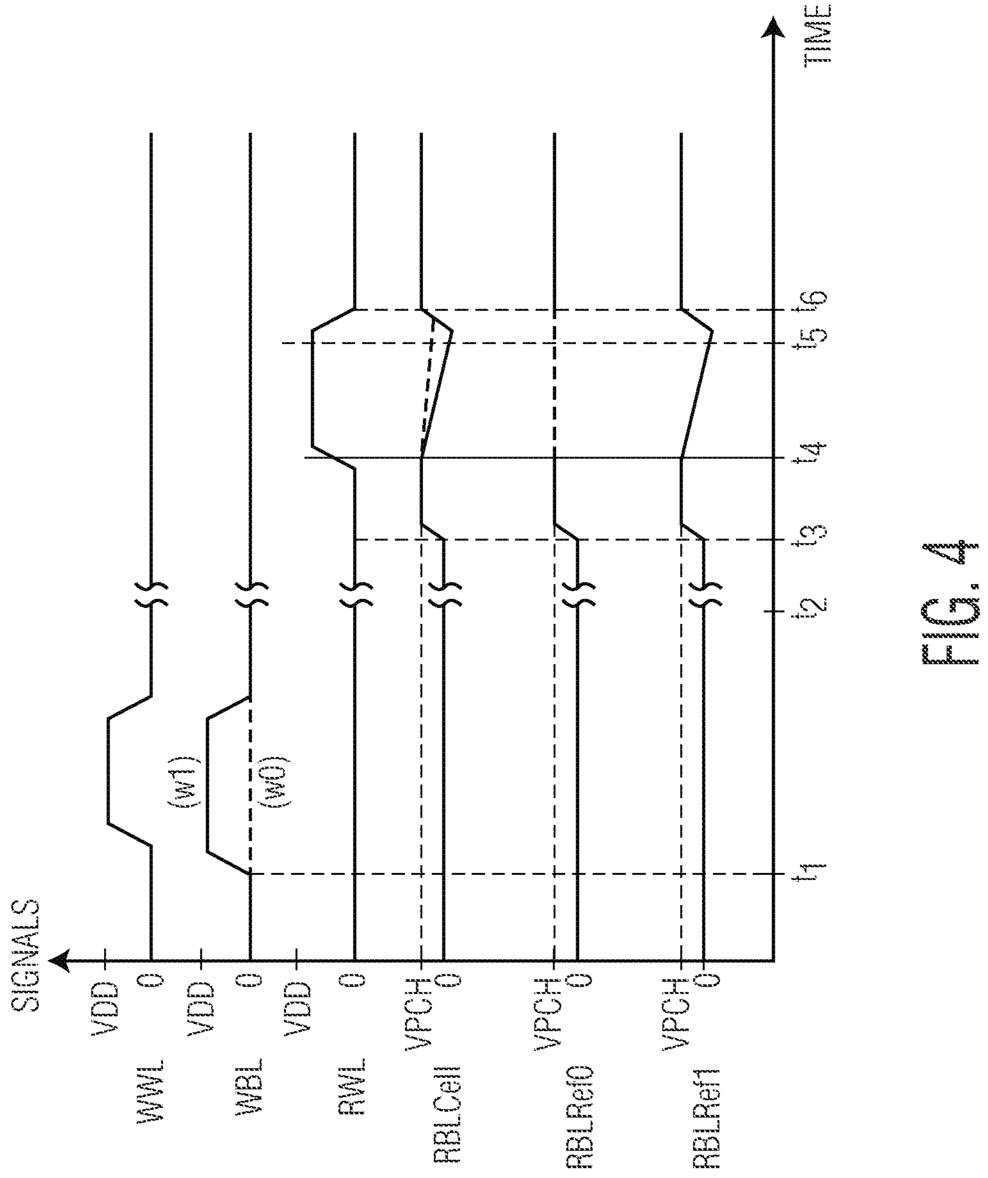
FIG. 4 illustrates waveforms for various signals of the DRAM of FIG. 1, in accordance with an embodiment of the present invention.

FIG. 4 illustrates a timing diagram of various signals within DRAM 10 for a write operation to a selected bit cell of data array 14 and a subsequent read operation from the selected bit cell, in accordance with one embodiment of the present invention. In the illustrated embodiment, the selected bit cell can be any bit cell of data array 14, in which the selected bit cell is one of k bit cells addressed by the access address of the write and read operations. WWL corresponds to the WWL of WWL1-M corresponding to the accessed row of data array 14 being written, which includes the selected bit cell. Similarly, RWL corresponds to the RWL of RWL1-RWLM corresponding to the accessed row of data array 14 being read, which includes the selected bit cell. WBL corresponds to the WBL of WBL1-*k* coupled to the selected bit cell being written, and RBLCell corresponds to the RBL of RBL1-*k* coupled to the selected bit cell being read, which provides one bit of the k-bit read value D1-Dk.

In a first portion of FIG. 4, a write operation to the selected bit cell is performed, in which, at time t1, WBL is either coupled to VDD (if a logic level one, w1, is being written to the selected bit cell) or to VSS (if a logic level zero, w0, is being written to the selected bit cell). Note that the logic value being written (w1 or w0) corresponds to one bit of the write value D1-Dk. After the appropriate voltage is applied to WBL, WWL is activated (e.g. asserted to VDD) such that the appropriate logic value is written into the selected bit cell. For example, the applied voltage results in either charging or discharging the storage capacitor of the selected bit cell. Time t2 corresponds to any period of time, after which a read from the selected bit cell is performed. Since the same bit cell that was previously written is being read, RWL corresponds to the same row of data array 14 as WWL. At some time prior to reading the selected bit cell, e.g. at time t3, the RBLs of array 12 (including RBLCell, RBLRef0, and RBLRef1) are each precharged to the precharge voltage, VPCH. In one embodiment, as described above, the precharge is performed by precharge circuit 22 to VDD via an NMOS transistor, such that VPCH=VDD-Vt (of the precharge NMOS transistor).

After precharging, RWL is activated. Upon being activated (e.g. at time t4), the RBLs are released to achieve (settle to) their final voltages based on the voltage on the gates of the corresponding storage transistor. Also, the sense amplifiers of read/write circuitry 24 are enabled. For RBLRef0 and RBLRef1, the gates of the corresponding storage transistors of the corresponding reference cells are continuously driven to VSS and VDD, respectively. Therefore, RBLRef0 maintains its precharge level (corresponding to a stored one), while RBLRef1 is pulled down to VSS (corresponding to a stored zero), as described above in reference to reference cells 32 and 33 of FIG. 2. The voltage on RBLCell settles in accordance to the charge on the corresponding storage capacitor (at the corresponding storage node at the gate of the storage transistor). The sense cycle of the read ends at time t6, therefore, at some point before the end of the sense cycle, after the RBLs have been given sufficient time to settle (e.g. at time t5), the outputs of sensing circuits 62-63 (the read output D1-Dk at the outputs of the second stages of the sensing circuits) are latched into IO buffer 26. Note that although FIG. 4 illustrates the write to and read from one bit cell of data array 14 as an example, the timing of signals of FIG. 4 apply to performing a write to and read from each bit of k selected bit cells of data array 14 (corresponding to a k-bit write value and k-bit read value, respectively).

Figure 5:
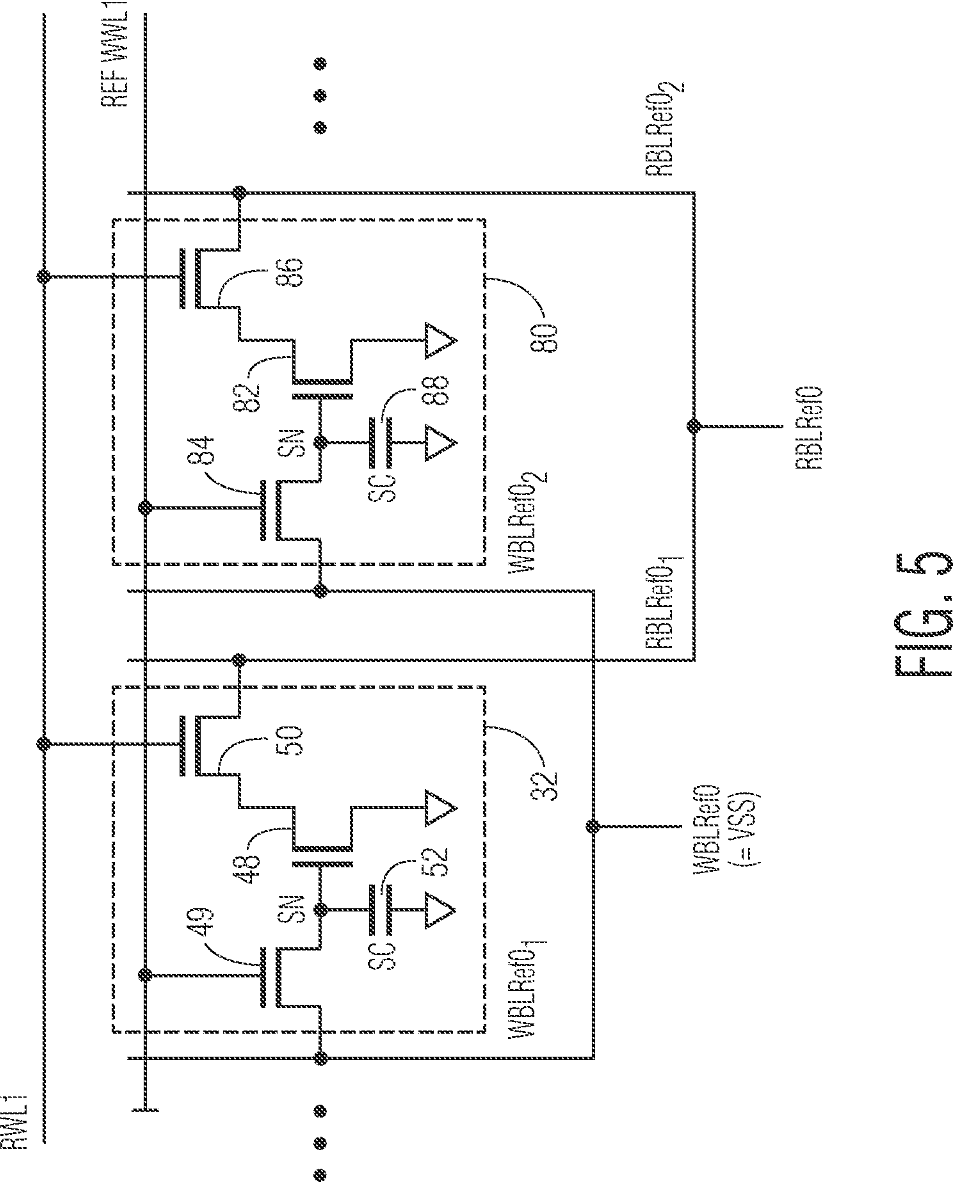
FIG. 5 illustrates, in schematic form, reference bit cells of the DRAM of FIG. 1 in accordance with an embodiment of the present invention.

FIG. 5 illustrates a portion of reference array 16 in accordance with an embodiment of the present invention, in which RBLRef0 and RBLRef1 are generated using multiple (at least two) columns with a common RBL to average any variation between the RBLs. The portion illustrated in FIG. 5 includes reference cell 32, as described above in reference to FIG. 2, and also includes an additional reference cell (0) 80 which is also located in the first row of array 12 and is also reenforced with a continuous write 0. Reference cell 80 includes storage transistor 82, access transistor 84, read access transistor 86, and capacitor 88 which are analogous to storage transistor 48, access transistor 49, read access transistor 50, and capacitor 52 of reference cell 32, in which they are connected and operate in the same way as described in reference to reference cell 32. In the illustrated embodiment, RWL1 is coupled to the control electrodes of both transistors 50 and 86, and REF WWL is coupled to the control electrodes of both transistors 49 and 84. In this embodiment, the WBL of each cell, WBLRef$\mathbf{0}_1$ of reference cell 32 and WBLRef$\mathbf{0}_2$ of reference cell 80 are tied together to form WBLRef0 (which is coupled to VSS, for the reasons described above for continuously writing a logic zero to the reference cells 32 and 80). Similarly, the RBL of each cell, RBLRef$\mathbf{0}_1$ of reference cell 32 and RBLRef$\mathbf{0}_2$ of reference cell 80 are tied together to form RBLRef0 (which provides one of the two references to the sensing circuits of read/write circuitry 24).

In the embodiment of FIG. 5, note that the first row may further include an additional reference cell (1), analogous to reference cell 33, which is reinforced with a continuous write 1 and whose WBLs and RBLs are tied together with reference cell 33, similar to those of references cells 32 and 80. Therefore, note that although FIG. 2 illustrates a single pair of reference cells (a '0' reference cell, continuously written with a zero, and a '1' reference cell, continuously written with a one) for each row of array 12, alternate embodiments may include any number of '0' reference cells (tied together as illustrated in the example of references cells 32 and 80 of FIG. 5) and any number of '1' reference cells (similarly tied together) for each row of array 12 to form reference array 16.

Also, although the read of the 3T DRAM cell described above is not a destructive read, in alternate embodiments, such as in a 1T1C DRAM cell, a read may destructive in that the read operation itself empties the storage capacitor. In these cases, DRAM 10 may also include circuitry to recharge the storage capacitors after each read.

Therefore, by now it can be appreciated how a dual reference scheme generated using at least a pair of reference cells can be used to achieve improved sensing for an embedded DRAM, even as read sense margins decrease due to leakage current. Further, since the references are generated using a reference cell portion of the DRAM array, the references allow for improved sensing across PVT variations. In one embodiment, in which the embedded DRAM includes a memory array having both a data array portion and a reference array portion, the dual references are generated based on reference cells of the reference array portion which are continuously written to logic ones and zeros. In this embodiment, the reference write word lines of the reference array portion are isolated from the write word lines of the data array portion of the DRAM so that they may be held at a selected voltage, as needed, to continuously write the ones or zeros. Also, with the use of the dual references, it may be feasible to reduce the refresh frequency and thus reduce latency, thereby improving performance.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture and exemplary memory system, these are presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of DRAM 10 are circuitry located on a single integrated circuit or within a same device, and is also located on the same integrated circuit or same device as the data processing system in which it is embedded. Alternatively, the information processing system may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the bit cells and reference bit cells of DRAM 10 may all be formed with a different type of DRAM bit cell using a capacitive storage elements and 2, 3, 4, or more transistors. Further, any type of device configuration may be used to implement the capacitive elements of the bit cells, or any parasitic capacitance may instead be used to implement the capacitive elements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term “coupled,” as used herein, is not intended to be limited to a direct coupling or a mechanical coupling.

Furthermore, the terms “a” or “an,” as used herein, are defined as one or more than one. Also, the use of introductory phrases such as “at least one” and “one or more” in the claims should not be construed to imply that the introduction of another claim element by the indefinite articles “a” or “an” limits any particular claim containing such introduced claim element to inventions containing only one such element, even when the same claim includes the introductory phrases “one or more” or “at least one” and indefinite articles such as “a” or “an.” The same holds true for the use of definite articles.

Unless stated otherwise, terms such as “first” and “second” are used to arbitrarily distinguish between the elements such terms describe. Thus, these terms are not necessarily intended to indicate temporal or other prioritization of such elements.

The following are various embodiments of the present invention. Note that any of the aspects below can be used in any combination with each other and with any of the disclosed embodiments.

In an embodiment, a memory system includes a dynamic random access memory (DRAM) array having a plurality of DRAM bit cells, each with a capacitive storage element, wherein a first portion of the DRAM array is configured as a data array and a second portion of the DRAM array is configured as a reference array, and the DRAM array includes read bit lines including a first plurality of read bit lines in the data array and a second plurality of read bit lines in the reference array; and read circuitry having a plurality of sensing circuits, each sensing circuit of the plurality of sensing circuits coupled to a corresponding read bit line of the first plurality of read bit lines and configured to receive a first reference voltage generated by a first read bit line of the second plurality of read bit lines and a second reference voltage generated by a second read bit line of the second plurality of bit lines, wherein the plurality of sensing circuits is configured to provide a corresponding bit of an output read value. In one aspect, the DRAM further includes a plurality of read word lines coupled to bit cells of the data array and reference bit cells of the reference array, a first plurality of write word lines coupled to the bit cells of the data array, and a second plurality of write word lines coupled to the reference bit cells of the reference array and segmented from the first plurality of write word lines. In a further aspect, the first plurality of read bit lines are coupled to the bit cells of the data array and the second plurality of read bit lines are coupled to the reference bit cells, and the DRAM further includes a first plurality of write bit lines coupled to the bit cells of the data array and a second plurality of write bit lines coupled to the reference bit cells of the reference array. In yet a further aspect, a corresponding first reference cell is located at each word line/bit line intersection of the second plurality of write word lines with a first write bit line of the second plurality of write bit lines, wherein the corresponding first reference cells are also coupled to the first read bit line, and a corresponding second reference cell is located at each word line/bit line intersection of the second plurality of write word lines with a second write bit line of the second plurality of write bit lines, wherein the corresponding second reference cells are also coupled to the second read bit line. In yet an even further aspect, each of the second plurality of write word lines is coupled to a first voltage supply node configured to provide a first supply voltage to continuously enable writes to the corresponding first and second reference bit cells coupled to the second plurality of write word lines. In yet an even further aspect, each of the corresponding first reference cells is continuously written to a first logic state, and each of the corresponding second reference cells is continuously written to a second logic state, opposite the first logic state. In yet an even further aspect, each of the corresponding first reference cells is configured to be continuously written to the first logic state and each of the corresponding second reference cells is configured to be continuously written to the second logic state while read and write operations are occurring on addressed bit cells in the data array. In another yet even further aspect, the first write bit line is coupled to a second voltage supply node configured to provide a second supply voltage, less than the first supply voltage, to continuously drive storage nodes of the corresponding first reference cells to the second supply voltage, and the second write bit line is coupled to the first voltage supply node to continuously drive storage nodes of the corresponding second reference cells to the first supply voltage. In another aspect of the embodiment, each sensing circuit includes a first stage configured to sense a first difference between a voltage on the corresponding read bit line and the first reference voltage and a second difference between the voltage on the corresponding read bit line and the second reference voltage, and a second stage configured to provide the corresponding bit of the output read value from a selected bit cell of the data array coupled to the corresponding read bit line based on the first and second differences. In a further aspect, the reference array is configured such that each reference bit cell of the reference array coupled to the first read bit line has a storage node that is continuously driven to a first logic state and each reference bit cell of the reference array coupled to the second read bit line has a storage node that is continuously written to a second logic state, different from the first logic state. In yet a further aspect, the DRAM further includes a first plurality of write word lines coupled to the bit cells of the data array, and a second plurality of write word lines coupled to the reference bit cells of the reference array and segmented from the first plurality of write word lines, wherein each word line of the second plurality of write word lines is held at a first supply voltage to continuously enable writes to each reference bit cell of the reference array. In yet an even further aspect, a first write bit line coupled to each reference bit cell coupled to the first read bit line is held at a first supply voltage to drive storage nodes of the reference bit cells of the reference array coupled to the first read bit line to the first supply voltage, and a second write bit line coupled to each bit cell coupled to the second read bit line is held at a second supply voltage to drive storage nodes of the reference bit cells coupled to the second read bit line to the second supply voltage.

In another embodiment, a memory system includes a dynamic random access memory (DRAM) array having a plurality of DRAM cells, each with a capacitive storage element, wherein a first portion of the DRAM array is configured as a data array and a second portion of the DRAM array is configured as a reference array, and the DRAM includes read bit lines including a first plurality of read bit lines in the data array and a second plurality of read bit lines in the reference array, wherein each bit cell in the reference array coupled to a first read bit line of the second plurality of bit lines has a corresponding storage node driven to a first logic state and each bit cell in the reference array coupled to a second read bit line of the second plurality of bit lines has a corresponding storage node driven to a second logic state, opposite the first logic state; and read circuitry having a plurality of sensing circuits, each sensing circuit of the plurality of sensing circuits coupled to a corresponding read bit line of the first plurality of read bit lines, the first read bit line, and the second read bit line, wherein the plurality of sensing circuits is configured to provide a corresponding bit of an output read value. In one aspect of the another embodiment, the DRAM further includes a plurality of read word lines coupled to bit cells of the data array and reference bit cells of the reference array, a first plurality of write word lines coupled to the bit cells of the data array, and a second plurality of write word lines coupled to the reference bit cells of the reference array and segmented from the first plurality of write word lines, wherein all word lines of the second plurality of word lines are continuously activated while reads and writes are occurring in the data array. In a further aspect, during a read operation, a selected read word line of the plurality of read word lines is activated, wherein the output read value is read from a selected set of bit cells of the data array coupled to the selected read word line and the corresponding read bit lines of the first plurality of bit lines, and reference voltages are generated by the first and second read bit lines based on the corresponding storage nodes of bit cells of the reference array coupled to the selected read word line, the first read bit line, and the second read bit line. In yet a further aspect, each sensing circuit includes a first stage configured to sense a first difference between a voltage on the corresponding read bit line and a first reference voltage generated by the first read bit line and a second difference between the voltage on the corresponding read bit line and a second reference voltage generated by the second read bit line, and a second stage configured to provide the corresponding bit of the output read value from a selected bit cell of the data array coupled to the corresponding read bit line based on the first and second differences. In another yet further aspect, each sensing circuit includes a first amplifier having a first input coupled to the first read bit line of the reference array and a second input coupled to the corresponding read bit line of the data array; a second amplifier having a first input coupled to the corresponding read bit line of the data array and a second input coupled to the second read bit line of the reference array; and a third amplifier having a first input coupled to receive an output of the first amplifier and a second input coupled to receive an output of the second amplifier, and an output configured to provide the corresponding bit of the output read value. In a further aspect, a gain of the third amplifier is greater than a gain of the first amplifier and greater than a gain of the second amplifier. In another further aspect, the first inputs of the first and second amplifiers are non-inverting inputs, and the second inputs of the first and second amplifiers are inverting inputs.

In yet another embodiment, in a dynamic random access memory (DRAM) array having a plurality of DRAM cells, each with a capacitive storage element, wherein a first portion of the DRAM array is configured as a data array and a second portion of the DRAM array is configured as a reference array, a method includes continuously writing reference bit cells in the reference array coupled to a first read bit line of the reference array to a first logic state and reference bit cells in the reference array coupled to a second read bit line of the reference array to a second logic state, different from the first logic state; and performing a read operation, wherein the read operation includes sensing read bit lines corresponding to a set of addressed bit cells of the data array, and comparing a sensed voltage of each of the read bit lines corresponding to the addressed bit cells of the data array to a first reference voltage generated by the first read bit line and to a second reference voltage generated by the second read bit line to generate an output read value for the read operation corresponding to stored states of the set of addressed bit cells of the data array.

What is claimed is:

1. A memory system, comprising:

a dynamic random access memory (DRAM) array having a plurality of DRAM bit cells, each with a capacitive storage element, wherein a first portion of the DRAM array is configured as a data array and a second portion of the DRAM array is configured as a reference array, the DRAM array comprising:

read bit lines including a first plurality of read bit lines in the data array and a second plurality of read bit lines in the reference array;

a plurality of read word lines coupled to bit cells of the data array and reference bit cells of the reference array;

a first plurality of write word lines coupled to the bit cells of the data array; and a second plurality of write word lines coupled to the reference bit cells of the reference array and segmented from the first plurality of write word lines; and read circuitry having a plurality of sensing circuits, each sensing circuit of the plurality of sensing circuits coupled to a corresponding read bit line of the first plurality of read bit lines and configured to receive a first reference voltage generated by a first read bit line of the second plurality of read bit lines and a second reference voltage generated by a second read bit line of the second plurality of bit lines, wherein the plurality of sensing circuits is configured to provide a corresponding bit of an output read value.

2. The memory system of claim 1, wherein the first plurality of read bit lines are coupled to the bit cells of the data array and the second plurality of read bit lines are coupled to the reference bit cells, the DRAM further comprising a first plurality of write bit lines coupled to the bit cells of the data array and a second plurality of write bit lines coupled to the reference bit cells of the reference array.

3. The memory system of claim 2, wherein:

a corresponding first reference cell is located at each word line/bit line intersection of the second plurality of write word lines with a first write bit line of the second plurality of write bit lines, wherein the corresponding first reference cells are also coupled to the first read bit line, and a corresponding second reference cell is located at each word line/bit line intersection of the second plurality of write word lines with a second write bit line of the second plurality of write bit lines, wherein the corresponding second reference cells are also coupled to the second read bit line.

4. The memory system of claim 3, wherein each of the second plurality of write word lines is coupled to a first voltage supply node configured to provide a first supply voltage to continuously enable writes to the corresponding first and second reference bit cells coupled to the second plurality of write word lines.

5. The memory system of claim 4, wherein each of the corresponding first reference cells is continuously written to a first logic state, and each of the corresponding second reference cells is continuously written to a second logic state, opposite the first logic state.

6. The memory of claim 5, wherein each of the corresponding first reference cells is configured to be continuously written to the first logic state and each of the corresponding second reference cells is configured to be continuously written to the second logic state while read and write operations are occurring on addressed bit cells in the data array.

7. The memory system of claim 5, wherein the first write bit line is coupled to a second voltage supply node configured to provide a second supply voltage, less than the first supply voltage, to continuously drive storage nodes of the corresponding first reference cells to the second supply voltage, and the second write bit line is coupled to the first voltage supply node to continuously drive storage nodes of the corresponding second reference cells to the first supply voltage.

8. The memory system of claim 1, wherein each sensing circuit comprises a first stage configured to sense a first difference between a voltage on the corresponding read bit line and the first reference voltage and a second difference between the voltage on the corresponding read bit line and the second reference voltage, and a second stage configured to provide the corresponding bit of the output read value from a selected bit cell of the data array coupled to the corresponding read bit line based on the first and second differences.

9. A memory system, comprising:

a dynamic random access memory (DRAM) array having a plurality of DRAM bit cells, each with a capacitive storage element, wherein a first portion of the DRAM array is configured as a data array and a second portion of the DRAM array is configured as a reference array, the DRAM array comprising:

read bit lines including a first plurality of read bit lines in the data array and a second plurality of read bit lines in the reference array; and read circuitry having a plurality of sensing circuits, each sensing circuit of the plurality of sensing circuits coupled to a corresponding read bit line of the first plurality of read bit lines and configured to receive a first reference voltage generated by a first read bit line of the second plurality of read bit lines and a second reference voltage generated by a second read bit line of the second plurality of bit lines, wherein the plurality of sensing circuits is configured to provide a corresponding bit of an output read value, wherein each sensing circuit comprises a first stage configured to sense a first difference between a voltage on the corresponding read bit line and the first reference voltage and a second difference between the voltage on the corresponding read bit line and the second reference voltage, and a second stage configured to provide the corresponding bit of the output read value from a selected bit cell of the data array coupled to the corresponding read bit line based on the first and second differences, wherein the reference array is configured such that each reference bit cell of the reference array coupled to the first read bit line has a storage node that is continuously driven to a first logic state and each reference bit cell of the reference array coupled to the second read bit line has a storage node that is continuously written to a second logic state, different from the first logic state.

10. The memory system of claim 9, wherein the DRAM further comprises:

a first plurality of write word lines coupled to the bit cells of the data array, and a second plurality of write word lines coupled to the reference bit cells of the reference array and segmented from the first plurality of write word lines, wherein each word line of the second plurality of write word lines is held at a first supply voltage to continuously enable writes to each reference bit cell of the reference array.

11. The memory system of claim 10, wherein:

a first write bit line coupled to each reference bit cell coupled to the first read bit line is held at a first supply voltage to drive storage nodes of the reference bit cells of the reference array coupled to the first read bit line to the first supply voltage, and a second write bit line coupled to each bit cell coupled to the second read bit line is held at a second supply voltage to drive storage nodes of the reference bit cells coupled to the second read bit line to the second supply voltage.

12. A memory system, comprising:

a dynamic random access memory (DRAM) array having a plurality of DRAM cells, each with a capacitive storage element, wherein a first portion of the DRAM array is configured as a data array and a second portion of the DRAM array is configured as a reference array, the DRAM comprising:

read bit lines including a first plurality of read bit lines in the data array and a second plurality of read bit lines in the reference array, wherein each bit cell in the reference array coupled to a first read bit line of the second plurality of bit lines has a corresponding storage node driven to a first logic state and each bit cell in the reference array coupled to a second read bit line of the second plurality of bit lines has a corresponding storage node driven to a second logic state, opposite the first logic state;

a plurality of read word lines coupled to bit cells of the data array and reference bit cells of the reference array;

a first plurality of write word lines coupled to the bit cells of the data array; and a second plurality of write word lines coupled to the reference bit cells of the reference array and segmented from the first plurality of write word lines, wherein all word lines of the second plurality of word lines are continuously activated while reads and writes are occurring in the data array; and read circuitry having a plurality of sensing circuits, each sensing circuit of the plurality of sensing circuits coupled to a corresponding read bit line of the first plurality of read bit lines, the first read bit line, and the second read bit line, wherein the plurality of sensing circuits is configured to provide a corresponding bit of an output read value.

13. The memory system of claim 12, wherein during a read operation, a selected read word line of the plurality of read word lines is activated, wherein the output read value is read from a selected set of bit cells of the data array coupled to the selected read word line and the corresponding read bit lines of the first plurality of bit lines, and reference voltages are generated by the first and second read bit lines based on the corresponding storage nodes of bit cells of the reference array coupled to the selected read word line, the first read bit line, and the second read bit line.

14. The memory system of claim 13, wherein each sensing circuit comprises a first stage configured to sense a first difference between a voltage on the corresponding read bit line and a first reference voltage generated by the first read bit line and a second difference between the voltage on the corresponding read bit line and a second reference voltage generated by the second read bit line, and a second stage configured to provide the corresponding bit of the output read value from a selected bit cell of the data array coupled to the corresponding read bit line based on the first and second differences.

15. The memory system of claim 13, wherein each sensing circuit comprises:

a first amplifier having a first input coupled to the first read bit line of the reference array and a second input coupled to the corresponding read bit line of the data array;

a second amplifier having a first input coupled to the corresponding read bit line of the data array and a second input coupled to the second read bit line of the reference array; and a third amplifier having a first input coupled to receive an output of the first amplifier and a second input coupled to receive an output of the second amplifier, and an output configured to provide the corresponding bit of the output read value.

16. The memory system of claim 15, wherein a gain of the third amplifier is greater than a gain of the first amplifier and greater than a gain of the second amplifier.

17. The memory system of claim 15, wherein the first inputs of the first and second amplifiers are non-inverting inputs, and the second inputs of the first and second amplifiers are inverting inputs.

18. In a dynamic random access memory (DRAM) array having a plurality of DRAM cells, each with a capacitive storage element, wherein a first portion of the DRAM array is configured as a data array and a second portion of the DRAM array is configured as a reference array, a method comprising:

continuously writing reference bit cells in the reference array coupled to a first read bit line of the reference array to a first logic state and reference bit cells in the reference array coupled to a second read bit line of the reference array to a second logic state, different from the first logic state; and performing a read operation, wherein the read operation includes:

sensing read bit lines corresponding to a set of addressed bit cells of the data array, and comparing a sensed voltage of each of the read bit lines corresponding to the addressed bit cells of the data array to a first reference voltage generated by the first read bit line and to a second reference voltage generated by the second read bit line to generate an output read value for the read operation corresponding to stored states of the set of addressed bit cells of the data array.

* * * * *